(12) United States Patent  
Albertsson et al.

(10) Patent No.: US 8,150,334 B2  
(45) Date of Patent: Apr. 3, 2012

(54) METHODS AND APPARATUS FOR PUSH TO TALK TYPE SERVICE

(75) Inventors: Henrik Albertsson, Stockholm (SE); Jan Holm, Örbyhus (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 751 days.

(21) Appl. No.: 12/091,109

(22) PCT Filed: Oct. 11, 2006

(86) PCT No.: PCT/EP2006/067297  
§ 371 (c)(1),  
(2), (4) Date: Jul. 25, 2008

(87) PCT Pub. No.: WO2007/048708  
PCT Pub. Date: May 3, 2007

(65) Prior Publication Data  
US 2009/0047915 A1 Feb. 19, 2009

(51) Int. Cl.  
*H04B 1/38* (2006.01)

(52) U.S. Cl. ............... 455/90.2; 455/90.1; 455/518

(58) Field of Classification Search ............. 455/90.1, 455/90.2  
See application file for complete search history.

(56) References Cited

U.S. PATENT DOCUMENTS

| | | | | |
|---|---|---|---|---|
| 6,041,294 A * | 3/2000 | Beerends | ............. | 704/203 |
| 6,064,946 A * | 5/2000 | Beerends | ............. | 702/57 |
| 6,360,093 B1 * | 3/2002 | Ross et al. | ............. | 455/414.1 |
| 6,795,011 B1 * | 9/2004 | Berthoud et al. | ............. | 341/173 |
| 7,023,813 B2 * | 4/2006 | Newberg et al. | ............. | 370/312 |
| 7,031,700 B1 * | 4/2006 | Weaver et al. | ............. | 455/420 |
| 7,107,017 B2 * | 9/2006 | Koskelainen et al. | ....... | 455/90.2 |
| 7,111,044 B2 * | 9/2006 | Lee | ............. | 709/204 |
| 7,415,284 B2 * | 8/2008 | Hoover et al. | ............. | 455/518 |
| 7,522,931 B2 * | 4/2009 | Ranalli et al. | ............. | 455/518 |
| 7,536,191 B2 * | 5/2009 | Luo et al. | ............. | 455/457 |
| 7,546,133 B2 * | 6/2009 | Harris et al. | ............. | 455/518 |
| 7,555,304 B2 * | 6/2009 | Schwagmann et al. | ....... | 455/518 |
| 7,558,286 B2 * | 7/2009 | Khatter | ............. | 370/468 |

(Continued)

FOREIGN PATENT DOCUMENTS

WO WO 2005/018200 A 2/2005

(Continued)

OTHER PUBLICATIONS

Open Mobile Alliance. OMA PoC Control Plane; Candidate Version 1.0—Oct. 6, 2005. Open Mobile Alliance OMA-TS-PoC-ControlPlane-V1_0-20051006-C.

(Continued)

*Primary Examiner* — Yuwen Pan  
*Assistant Examiner* — Hai Nguyen

(57) ABSTRACT

A method and server for establishing a push to talk type service such as push to talk over cellular (PoC). The server receives a message from Client A indicating one or more media types that Client A will accept in defined circumstances in a push to talk type session. When the server receives a message from Client B inviting Client A to establish a push to talk type session for one or more proposed media types, the server determines whether the media type(s) proposed by Client B are acceptable to Client A. If at least one proposed media type is acceptable, the server forwards the invitation to Client A with a list of the acceptable media types. Thereafter the session is established.

21 Claims, 2 Drawing Sheets

U.S. PATENT DOCUMENTS

| | | | |
|---|---|---|---|
| 7,668,515 B2 * | 2/2010 | Mayblum et al. | 455/90.2 |
| 7,672,684 B2 * | 3/2010 | Holm | 455/518 |
| 7,697,950 B2 * | 4/2010 | Jin et al. | 455/518 |
| 7,720,498 B2 * | 5/2010 | Lee | 455/518 |
| 7,760,744 B1 * | 7/2010 | Mohaban | 370/401 |
| 7,801,953 B1 * | 9/2010 | Denman et al. | 709/204 |
| 7,826,603 B1 * | 11/2010 | Denman et al. | 379/202.01 |
| 7,844,293 B2 * | 11/2010 | Sung et al. | 455/518 |
| 7,886,063 B2 * | 2/2011 | Huh et al. | 709/228 |
| 7,991,898 B2 * | 8/2011 | Huh et al. | 709/228 |
| 8,036,608 B2 * | 10/2011 | Holm | 455/90.2 |
| 2003/0229699 A1 * | 12/2003 | Moran et al. | 709/227 |
| 2004/0220538 A1 * | 11/2004 | Panopoulos | 604/361 |
| 2005/0020245 A1 * | 1/2005 | Su et al. | 455/412.1 |
| 2005/0192039 A1 * | 9/2005 | Xue et al. | 455/517 |
| 2005/0261015 A1 * | 11/2005 | Schwagmann et al. | 455/518 |
| 2006/0003740 A1 * | 1/2006 | Munje | 455/412.1 |
| 2006/0034260 A1 * | 2/2006 | Svedberg et al. | 370/352 |
| 2006/0046757 A1 * | 3/2006 | Hoover et al. | 455/518 |
| 2006/0046758 A1 * | 3/2006 | Emami-Nouri et al. | 455/518 |
| 2006/0072526 A1 * | 4/2006 | Rasanen | 370/338 |
| 2006/0073795 A1 * | 4/2006 | Mayblum et al. | 455/90.2 |
| 2006/0084454 A1 * | 4/2006 | Sung et al. | 455/518 |
| 2006/0149811 A1 * | 7/2006 | Bennett et al. | 709/203 |
| 2006/0153102 A1 * | 7/2006 | Kuure et al. | 370/263 |
| 2006/0155814 A1 * | 7/2006 | Bennett et al. | 709/207 |
| 2006/0229094 A1 * | 10/2006 | Huh et al. | 455/518 |
| 2006/0270361 A1 * | 11/2006 | Szymanski et al. | 455/90.2 |
| 2006/0292292 A1 * | 12/2006 | Brightman et al. | 427/66 |
| 2007/0010275 A1 * | 1/2007 | Kiss | 455/521 |
| 2007/0021138 A1 * | 1/2007 | Allen et al. | 455/518 |
| 2007/0091860 A1 * | 4/2007 | Lery et al. | 370/338 |
| 2007/0113162 A1 * | 5/2007 | Lery | 714/800 |
| 2007/0281681 A1 * | 12/2007 | Holm | 455/422.1 |
| 2008/0020718 A1 * | 1/2008 | Jin et al. | 455/90.2 |
| 2008/0268792 A1 * | 10/2008 | Munje | 455/90.2 |
| 2009/0203331 A1 * | 8/2009 | Ranalli et al. | 455/90.2 |
| 2009/0298487 A1 * | 12/2009 | Przybysz et al. | 455/416 |
| 2010/0248772 A1 * | 9/2010 | Denman et al. | 455/518 |

FOREIGN PATENT DOCUMENTS

WO    WO 2006032940 A1 *  3/2006

OTHER PUBLICATIONS

Open Mobile Alliance. Push to Talk Over Cellular (POC)—Architecture; Candidate Version 1.0—Oct. 6, 2005. Open Mobile Alliance OMA-AS_PoC-V1_0-20051006-C.

* cited by examiner

METHODS AND APPARATUS FOR PUSH TO TALK TYPE SERVICE

This application claims the benefit of European Patent Application No. 05110139.2, filed Oct. 28, 2005, the disclosure of which is fully incorporated herein by reference.

TECHNICAL FIELD OF THE INVENTION

The present invention relates generally to communication networks, and in particular, to an apparatus and method for providing dynamic Push to Talk Over Cellular (PoC) service options in wireless communication networks.

DESCRIPTION OF RELATED ART

Push to Talk Over Cellular (PoC) is a fast-connect, half-duplex service of the type generally known as Push-to-Talk (PTT) or voice chat services. PTT applications provide wireless users with a virtually instantaneous method of connecting to other users, with just the touch of a button on their handset. The PoC service is half-duplex and can be used for one-to-one private calls as well as one-to-many group calls. The users of PoC service can take advantage of private, direct, and simultaneous radio voice: connection over very wide areas, affordably and conveniently, often replacing other devices such as pagers and two-way radios. Users receiving the call hear the caller's voice automatically without having to answer the call.

PoC is the official name used in the open specifications currently being developed by the Open Mobile Alliance (OMA) for this service. The PoC specifications utilize a number of existing specifications from the Internet Engineering Task Force (IETF), the Third Generation Partnership Project (3GPP), and 3GPP2 (including the capabilities of the 3GPP IP Multimedia Subsystem (IMS) and the 3GPP2 Multimedia Domain (MMD)) to enable IP connectivity between mobile devices. In one solution, PoC uses a server, which is independent of the existing radio and core networks. PoC may be implemented on the IP backbone over radio technologies such as WCDMA, CDMA2000, GPRS, UMTS, and 802.11.

The use of IMS and MMD adds the ability to integrate voice and data services over IP-based packet-switched networks. Two fundamental capabilities are added on top of the packet-switched domain. First is the ability to find a user via the Session Initiation Protocol (SIP) to initiate a session. Second is the ability to integrate new services such as PTT. By introducing IMS and its multiple service-delivery capability, a common infrastructure for services is established, and the requirement to build a service delivery infrastructure for each service is eliminated.

The existing PoC standard defines two service-barring options and an answering mode service option requiring configuration in the network. These three options are as given below:
  Incoming Session Barring for PoC Communication;
  Incoming Session Barring for PoC Alert; and
  Answering Mode (automatic or manual answering mode).
    These three options are very dynamic, and traditional management cannot be used.

The existing PoC standard also defines the following terminal capabilities requiring configuration in the network:
  Supported codecs for encoding voice signals; and
  Supported codecs for decoding voice signals.

The existing PoC standard specifies some dynamic service options, but there is no solution for configuring dynamic PoC-related features and capabilities in the network. The answering mode, for example, can be set to automatic or manual mode. If the answering mode is set to manual, call establishment is the same as a normal SIP call. However, if the answering mode is set to automatic, the network allows the calling PoC user to start speaking at the same time as the called user is invited. The SIP protocol requires that the network then return the codec for use with the call. This creates a problem for the network because the codec selected for the call may not be supported by the called user. In this case, the network must perform transcoding between the calling PoC user and the called PoC user. The transcoding of audio, compressed with codecs used by PoC terminals, will produce poor sound quality.

One solution to this problem is to always use the same codec (i.e., a default codec). However, this may also be a problem since each PoC terminal may be connected via different access technologies with different views on available bandwidth and on which default codec to use.

Accordingly, there is a need for an improved apparatus and method for providing dynamic PoC service options.

SUMMARY OF THE INVENTION

The present invention provides a solution in which service options and terminal capabilities for PoC Clients are stored in the network. The service options and terminal capabilities may be stored in the PoC Server or in a server close to the PoC server. In a preferred embodiment, a PoC Client uses the SIP PUBLISH method to set the actual status of the answering mode and any service-barring option, and, if automatic answering mode is set, also stores a list of codecs that the PoC Client supports. By telling the network which codecs the PoC Client supports, the network can then make a more intelligent selection of the codec in the automatic answer case, and can also utilize better codecs when the access technology allows. The service options may be retrieved by the PoC Server or any other service that requires knowledge about the present service option and settings for terminal capabilities.

Thus in one aspect, the present invention is directed to a method of providing dynamic PoC service options. The method includes the steps of: storing service options of a calling PoC client and a called PoC client in a server; retrieving the stored service options during establishment of a data/audio session between the calling PoC client and the called PoC client; and utilizing the retrieved service options to optimize the session.

In another aspect, the present invention is directed to a method of providing dynamic PoC service options. The method includes the steps of: storing in a server, an indication of whether an answering mode of a called PoC client is set to automatic or manual, and an indication of which codecs are supported by the called PoC client for decoding encoded voice signals; and, receiving in the server, a request from a calling PoC client to establish a session with the called PoC client. The request includes an indication of which codecs are supported by the calling PoC client for encoding voice signals. If the answering mode of the called PoC client is set to automatic, the server selects a codec that is supported by both the calling PoC client and the called PoC client, and notifies the calling PoC client and the called PoC client of the codec selected for use during the session.

In yet another aspect, the present invention is directed to an apparatus for providing dynamic PoC service options. The apparatus includes: a database for storing an indication of whether an answering mode of a called PoC client is set to automatic or manual, and an indication of which codecs are supported by the called PoC client for decoding encoded voice signals; means for receiving a request message from a calling PoC client to establish a session with the called PoC client; and a codec selector for selecting a codec that is supported by both the calling PoC client and the called PoC client. The apparatus also includes means, responsive to receiving the request message, for retrieving from the database the indication of the answering mode of the called PoC client, and the indication of which codecs are supported by the called PoC client. If the answering mode is automatic, the indication of which codecs are supported by the called PoC client is sent to the codec selector. The apparatus also includes: means, responsive to an indication that the answering mode of the called PoC client is set to automatic, for extracting from the request message an indication, of which codecs are supported by the calling PoC client for encoding voice signals, wherein the indication of which codecs are supported by the calling PoC client is sent to the codec selector; and means for notifying the calling PoC client and the called PoC client of the codec selected for use during the session.

DETAILED DESCRIPTION OF EMBODIMENTS

Figure 1:
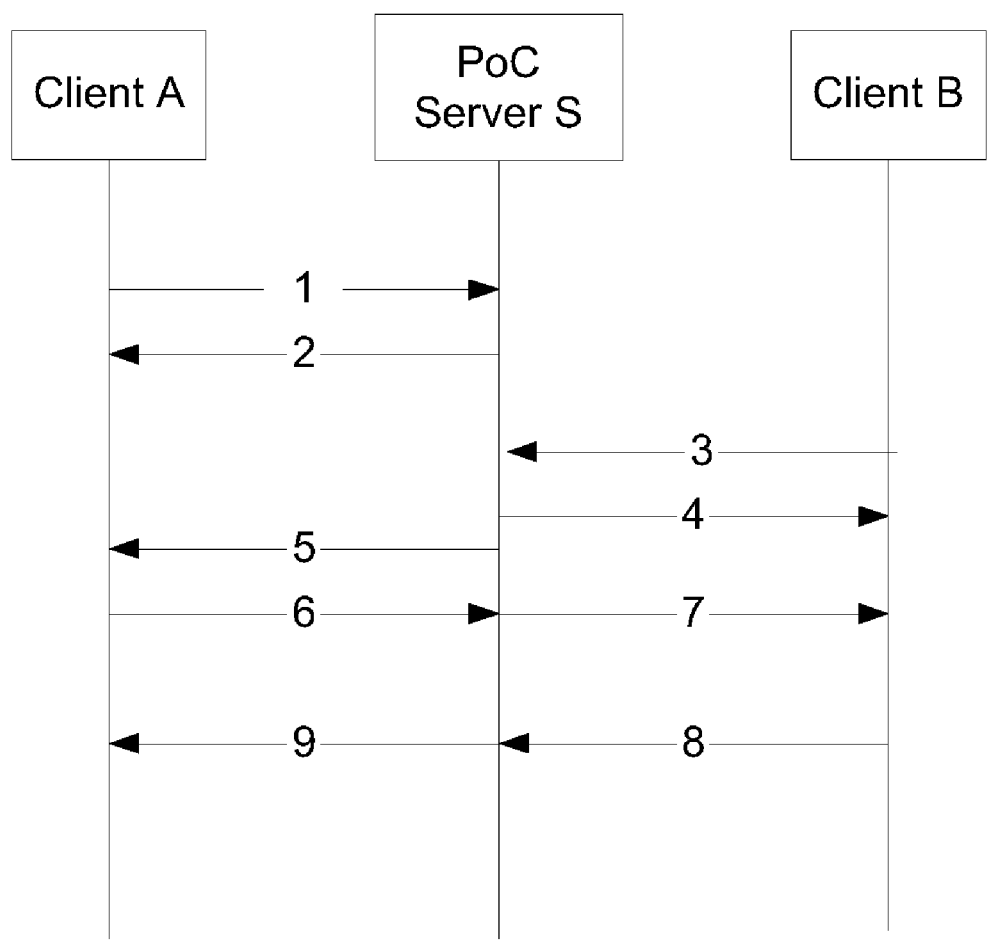
FIG. 1 is a signaling diagram illustrating an embodiment of the method of the present invention.

FIG. 1 is a signaling diagram illustrating an exemplary embodiment of the method of the present invention. Illustrated are a called client (PoC Client B) 11, a SIP/IP core network 12, a PoC server 13, an originating network 14, and a calling client (PoC Client A) 15. At step 16, the user of PoC Client B changes a service option. A service option may include Incoming Session Barring for PoC Communication, Incoming Session Barring for PoC Alert, or Answering Mode (automatic or manual). For example, the PoC Client B may change its answering mode to automatic.

The PoC Client B 11 then uses the PUBLISH method to set service options and terminal capabilities in the network. The PoC Client B sends a PUBLISH request message 17 to the SIP/IP Core 12 and includes, in this example, an indication that the answering mode is set to automatic, and an indication of the types of codecs supported by the PoC Client B. At step 18, the PUBLISH request message is forwarded to the PoC Server 13. Since the answering mode is set to automatic, the codecs supported by PoC Client B are also uploaded to the PoC Server. The PoC Server then returns a SIP 200 OK message 19 to the SIP/IP Core, which forwards the message at step 21 to the PoC Client B.

At that point in the example, PoC Client A 15 invites the PoC Client B 11 to a call. This is done by PoC Client A sending a SIP INVITE message 22 to the originating network 14, which forwards the message at step 23 to the SIP/IP Core 12. The INVITE message includes a list of codecs supported by PoC Client A. The SIP/IP Core, in turn, forwards the INVITE message at step 24 to the PoC Server 13. The PoC Server then selects a codec from the lists of supported codecs received from PoC Client A and PoC Client B. This enables the PoC Server to select a codec and optimize bandwidth efficiency and audio quality with respect to the access technology being utilized by the two clients. The PoC server then includes an indication of the selected codec in a 183 Session Progress message 25, which is sent to the SIP/IP Core. At step 26, the SIP/IP Core forwards the 183 Session Progress message to the originating network, which then sends a SIP 200 OK message 27 with an indication of the selected codec to the PoC Client A.

Establishment of the session then proceeds. At step 28, the PoC Client A 15 begins to send media, coded with the selected codec, to the originating network 14. Meanwhile, the PoC Server 13 sends a SIP INVITE request message 29 to the SIP/IP Core 12, and includes an indication of the selected codec. At step 31, the SIP/IP Core forwards the SIP INVITE request message with the indication of the selected codec to the PoC Client B 11. The PoC Client B returns a SIP 200 OK message 32, acknowledging the INVITE and the selected codec to the SIP/IP Core. At step 33, the SIP/IP Core forwards the 200 OK message to the PoC Server. At step 34, the PoC Server returns a SIP 200 OK message with an indication of the selected codec to the SIP/IP Core, which forwards the message to the originating network at step 35. At step 36, the originating network sends the media, coded with the selected codec, to the PoC Server, which forwards the encoded media to the PoC Client B at step 37.

Thus, the invention uses the well-known SIP protocol to publish dynamic data utilized to optimize bandwidth efficiency and audio quality. The use of SIP makes it possible to route the PUBLISH request to a PoC Server in a well-known manner and independent of the location.

Figure 2:
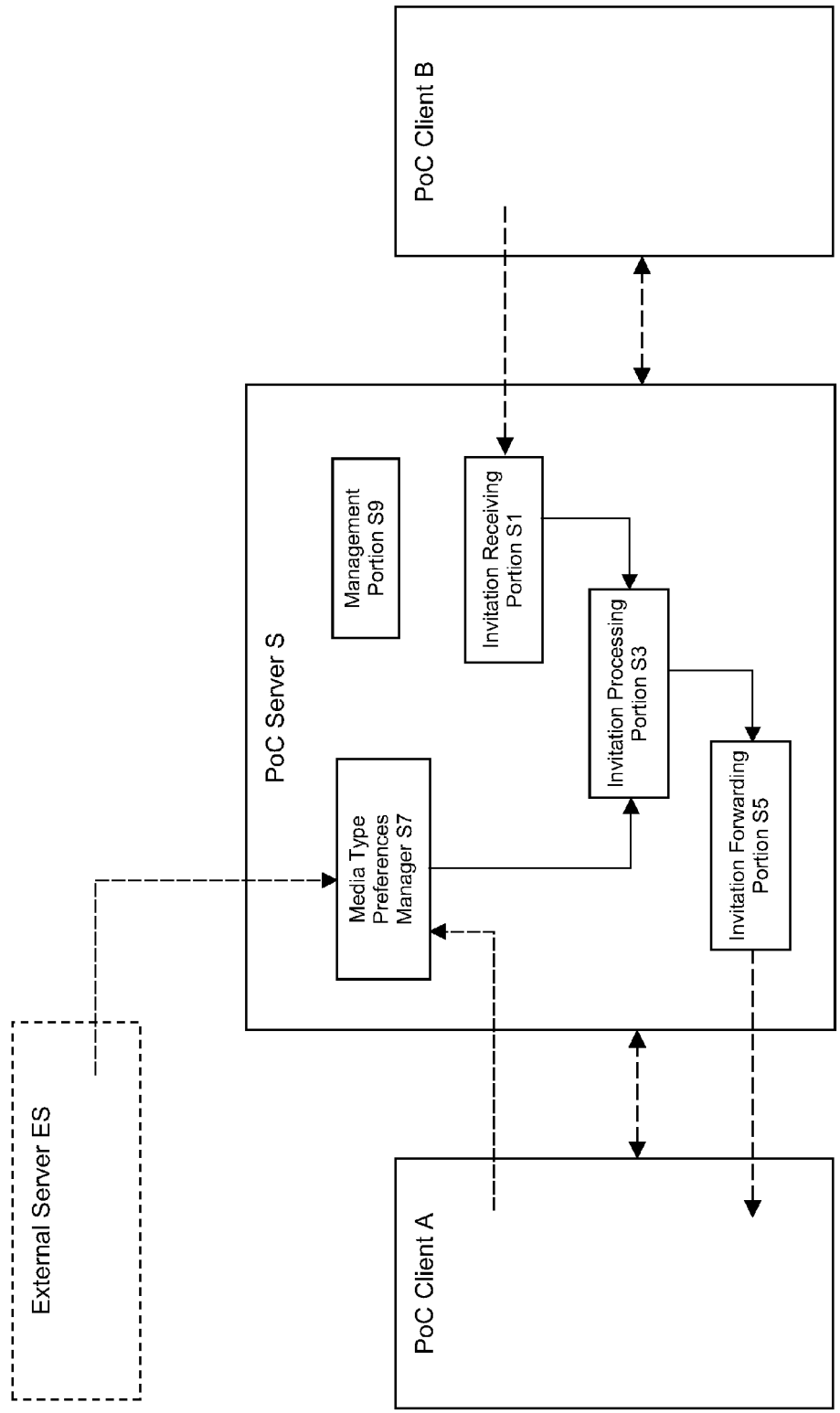
FIG. 2 is a simplified functional block diagram of a PoC Server modified in accordance with the present invention.

FIG. 2 is a simplified functional block diagram of the PoC Server 13 modified in accordance with the present invention. A dynamic PoC service option controller 41 controls signaling to and from the PoC Server according to service options that are stored in a user database 42. In the exemplary embodiment illustrated, the controller receives the PUBLISH message 18 sent by the PoC Client B 11, and stores the answering mode and the indication of the codecs supported by PoC Client B in the database. When the controller receives the INVITE message 24 sent by PoC Client A 15, the controller retrieves the data from the database and determines, using an answer mode analyzer 43, whether the answering mode is manual or automatic. If the answer mode analyzer determines that the PoC Client B's answering mode is manual, the controller 41 uses normal SIP procedures 45 to establish the session.

However, if the answer mode analyzer determines that the PoC Client B's answering mode is automatic, the controller extracts the indication of the Client A-supported codecs from the INVITE message, and sends the retrieved indication of the Client B-supported codecs and the extracted indication of the Client A-supported codecs to a codec selector 44. The codec selector selects a codec that is supported by both PoC Client A and PoC Client B, and returns an indication of the selected codec to the controller. The controller then includes the indication of the selected codec in the 183 Session Progress message 25 sent toward PoC Client A and the INVITE message 29 sent toward PoC Client B. The session is then established utilizing the selected codec. It should be recognized that the answer mode analyzer 43 and the codec selector 44 may be functionally implemented as part of the dynamic PoC service option controller 41 or as separate functional units.

Those skilled in the art will readily appreciate that the present invention may be implemented using either hardware, or software, or both. Furthermore, software implementations may vary using different languages and data structures. The present invention is not limited to a specific language and/or class of languages, nor is it limited to any single data structure implementation.

The present invention may, of course, be carried out in other specific ways than those herein set forth without departing from the essential characteristics of the invention. The

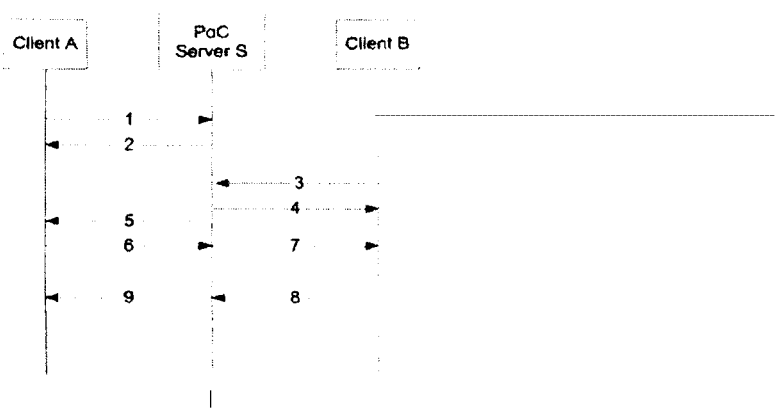

What is claimed is:

1. A method for use in a push to talk over cellular service, said method comprising the steps of:
   receiving at a server, a first message from a first terminal indicating for at least one media type supported by the first terminal, defined circumstances under which the first terminal will bar the at least one supported media type in a push to talk type session, even though the first terminal is capable of supporting the given media type;
   receiving at the server, a second message from a second terminal inviting the first terminal to establish a push to talk type session, the second message including a list of media types that the second terminal proposes to send to the first terminal during the session;
   in response to receipt of the message from the second terminal, comparing by the server, the list of proposed media types received from the second terminal with the at least one media type supported by the first terminal, and comparing current circumstances with the defined circumstances received from the first terminal to eliminate any proposed media types that are supported by the first terminal but are barred by the first terminal under the current circumstances; and
   sending a third message with the list of proposed media types from the server to the first terminal if at least one proposed media type is supported and not barred by the first terminal under the current circumstances.

2. The method as claimed in claim 1, wherein if it is determined that there are no media types proposed by the second terminal that are supported and not barred by the first terminal, the method further comprises not forwarding the message from the second terminal to the first terminal and sending a message from the server to the second terminal rejecting the session invitation.

3. The method as claimed in claim 1, further comprising:
   receiving a response message at the server sent from the first terminal accepting the session and confirming as acceptable the media types from the reviewed list; and
   forwarding the response message from the server to the second terminal.

4. The method as claimed in claim 3, further comprising setting up the session by the server based on the media types confirmed as acceptable in the response message.

5. The method as claimed in claim 3, wherein the response message is a 200 OK message of the Session Initiation Protocol.

6. The method as claimed in claim 1, wherein the message from the first terminal is a Publish message of the Session Initiation Protocol.

7. The method as claimed in claim 6, further comprising acknowledging the Publish message by the server with a 200 OK message of the Session Initiation Protocol.

8. The method as claimed in claim 1, wherein the server also receives information regarding the media types that the first terminal will accept or bar in defined circumstances from a PoC XDMS remote server.

9. The method as claimed in claim 8, wherein at least some of the information is determined based on at least one predetermined characteristic of the first terminal.

10. The method as claimed in claim 9, wherein one of the predetermined characteristics of the first terminal relates to the type of the push to talk type service that the first terminal is operating.

11. The method as claimed in claim 1, wherein the message from the first terminal specifies, for the at least one media type, whether or not the first terminal would bar that media type in a push to talk type session based not only on the media type itself but also on at least one other predetermined criterion.

12. The method as claimed in claim 11, wherein one predetermined criterion relates to the identity of the inviting terminal and/or its user.

13. The method as claimed in claim 1, wherein the message from the first terminal specifies, for the at least one media type, whether or not the first terminal would bar that media type in a push to talk type session based only on the media type itself.

14. The method as claimed in claim 1, wherein a default policy is referred to by the server for any proposed media type not specified in the message from the first terminal.

15. The method as claimed in claim 1, wherein the invite message is an Invite message of the Session Initiation Protocol.

16. The method as claimed in claim 1, wherein Session Description Protocol parameters are used to specify the list of media types.

17. The method as claimed in claim 1, wherein the defined circumstances received from the first terminal identify at least one user, and for each identified user, define media types that the first terminal will accept or bar from the identified user.

18. The method as claimed in claim 1, wherein the defined circumstances received from the first terminal identify times of day during which the first terminal will accept or bar defined media types.

19. A server for use in a push to talk over cellular service, said server comprising:
   a receiver that receives a first message from a first terminal indicating for at least one media type supported by the first terminal, defined circumstances under which the first terminal will bar the at least one supported media type in a push to talk type session, even though the first terminal is capable of supporting the given media type, wherein the receiver also receives a second message from a second terminal inviting the first terminal to establish a push to talk type session, the second message including a list of media types that the second terminal proposes to send to the first terminal during the session;
   a processor that compares the list of proposed media types received from the second terminal with the at least one media type supported by the first terminal, and that compares current circumstances with the defined circumstances received from the first terminal to eliminate any proposed media types that are supported by the first terminal but are barred by the first terminal under the current circumstances; and
   a transmitter that sends a third message with the list of proposed media types to the first terminal if at least one proposed media type is supported and not barred by the first terminal under the current circumstances.

20. The server as claimed in claim 19, wherein the defined circumstances received from the first terminal identify at least one user, and for each identified user, define media types that the first terminal will accept or bar from the identified user.

21. The server as claimed in claim 19, wherein the defined circumstances received from the first terminal identify times of day during which the first terminal will accept or bar defined media types.

* * * * *

UNITED STATES PATENT AND TRADEMARK OFFICE
CERTIFICATE OF CORRECTION

PATENT NO. : 8,150,334 B2  
APPLICATION NO. : 12/091109  
DATED : April 3, 2012  
INVENTOR(S) : Albertsson et al.

Page 1 of 3

It is certified that error appears in the above-identified patent and that said Letters Patent is hereby corrected as shown below:

The Title page showing the illustrative figure should be deleted to be replaced with the attached Title page.

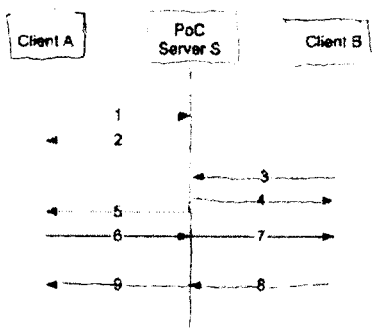

On the Title Page, in Figure, delete " " and

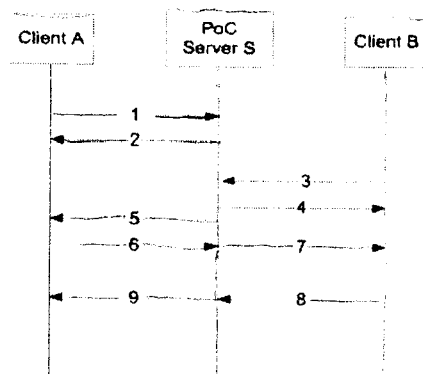

insert -- -- , therefor.

On Title Page 2, in Item (56), under "OTHER PUBLICATIONS", in Column 2, Line 1, delete "(POC)" and insert -- (PoC) --, therefor.

Signed and Sealed this  
Twenty-eighth Day of May, 2013

Teresa Stanek Rea  
*Acting Director of the United States Patent and Trademark Office*

CERTIFICATE OF CORRECTION (continued)
U.S. Pat. No. 8,150,334 B2

In the Specifications:

In Column 1, Line 25, delete "voice:" and insert -- voice, --, therefor.

In Column 3, Line 14, delete "indication," and insert -- indication --, therefor.

In Column 5, Line 3, delete "and," and insert -- and --, therefor.

(12) United States Patent
Albertsson et al.

(10) Patent No.: US 8,150,334 B2
(45) Date of Patent: Apr. 3, 2012

(54) METHODS AND APPARATUS FOR PUSH TO TALK TYPE SERVICE

(75) Inventors: Henrik Albertsson, Stockholm (SE); Jan Holm, Örbyhus (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 751 days.

(21) Appl. No.: 12/091,109

(22) PCT Filed: Oct. 11, 2006

(86) PCT No.: PCT/EP2006/067297
§ 371 (c)(1), (2), (4) Date: Jul. 25, 2008

(87) PCT Pub. No.: WO2007/048708
PCT Pub. Date: May 3, 2007

(65) Prior Publication Data
US 2009/0047915 A1 Feb. 19, 2009

(51) Int. Cl.
*H04B 1/38* (2006.01)
(52) U.S. Cl. .......... 455/90.2; 455/90.1; 455/518
(58) Field of Classification Search .......... 455/90.1, 455/90.2
See application file for complete search history.

(56) References Cited

U.S. PATENT DOCUMENTS

| | | | |
|---|---|---|---|
| 6,041,294 A * | 3/2000 | Beerends | 704/203 |
| 6,064,946 A * | 5/2000 | Beerends | 702/57 |
| 6,360,093 B1 * | 3/2002 | Ross et al. | 455/414.1 |
| 6,795,011 B1 * | 9/2004 | Berthoud et al. | 341/173 |
| 7,023,813 B2 * | 4/2006 | Newberg et al. | 370/312 |
| 7,031,700 B1 * | 4/2006 | Weaver et al. | 455/420 |
| 7,107,017 B2 * | 9/2006 | Koskelainen et al. | 455/90.2 |
| 7,111,044 B2 * | 9/2006 | Lee | 709/204 |
| 7,415,284 B2 * | 8/2008 | Hoover et al. | 455/518 |
| 7,522,931 B2 * | 4/2009 | Ranalli et al. | 455/518 |
| 7,536,191 B2 * | 5/2009 | Luo et al. | 455/457 |
| 7,546,133 B2 * | 6/2009 | Harris et al. | 455/518 |
| 7,555,304 B2 * | 6/2009 | Schwagmann et al. | 455/518 |
| 7,558,286 B2 * | 7/2009 | Khatter | 370/468 |

(Continued)

FOREIGN PATENT DOCUMENTS

WO  WO 2005/018200 A  2/2005

(Continued)

OTHER PUBLICATIONS

Open Mobile Alliance. OMA PoC Control Plane; Candidate Version 1.0—Oct. 6, 2005. Open Mobile Alliance OMA-TS-PoC-ControlPlane-V1_0-20051006-C.

(Continued)

*Primary Examiner* — Yuwen Pan
*Assistant Examiner* — Hai Nguyen

(57) ABSTRACT

A method and server for establishing a push to talk type service such as push to talk over cellular (PoC). The server receives a message from Client A indicating one or more media types that Client A will accept in defined circumstances in a push to talk type session. When the server receives a message from Client B inviting Client A to establish a push to talk type session for one or more proposed media types, the server determines whether the media type(s) proposed by Client B are acceptable to Client A. If at least one proposed media type is acceptable, the server forwards the invitation to Client A with a list of the acceptable media types. Thereafter the session is established.

21 Claims, 2 Drawing Sheets